United States Patent
Goettel et al.

[11] Patent Number: 5,964,449
[45] Date of Patent: Oct. 12, 1999

[54] BRAKE VALVE LATCH WITH ENHANCED LUBRICITY

[75] Inventors: Walter E. Goettel, Monongahela; George Drahusz, North Huntington, both of Pa.

[73] Assignee: Westinghouse Air Brake Company, Wilmerding, Pa.

[21] Appl. No.: 09/069,356

[22] Filed: Apr. 29, 1998

[51] Int. Cl.[6] .................................................. F16K 31/524
[52] U.S. Cl. ........................................ 251/355; 251/297
[58] Field of Search ...................................... 251/297, 355

[56] References Cited

U.S. PATENT DOCUMENTS

| | | | |
|---|---|---|---|
| 2,852,037 | 9/1958 | Downing et al. | 251/355 X |
| 5,205,538 | 4/1993 | Mackoway, Jr. et al. | 251/297 |

*Primary Examiner*—John Fox
*Attorney, Agent, or Firm*—James Ray & Associates

[57] ABSTRACT

The present invention provides an improved lubrication system for use in a railway locomotive brake valve. Such railway locomotive brake valve includes a suppression cam having a plurality of detented control positions. It further includes a handle connected to the suppression cam for moving the suppression cam to such plurality of detented control positions. There is a spring loaded latch mechanism for engaging the suppression cam and providing a positive stop for such plurality of detented positions. The latch mechanism is a cylindrically shaped member with an elongated convex shaped protrusion at one end for engaging the suppression cam. Such brake valve further includes a bushing surrounding and guiding such latch mechanism. Such improved lubrication system comprises a coating of a preselected low friction material applied to and dried on at least one of the latch mechanism, the bushing and the suppression cam.

20 Claims, 2 Drawing Sheets

BRAKE VALVE LATCH WITH ENHANCED LUBRICITY

FIELD OF THE INVENTION

This invention relates, in general, to a brake valve used on a railway vehicle and, more particularly, this invention relates to an improved means of reducing friction in the brake valve latching mechanism for use in a railway locomotive brake valve.

BACKGROUND OF THE INVENTION

The 30 Type CDW Brake Valve, designed and developed by Westinghouse Air Brake Company, is mounted in a locomotive cab and is used by locomotive engineers as a means of initiating a train brake application. When the engineer desires to apply the brakes on a train, the automatic handle of such brake valve is simply pushed forward until the desired brake application has been achieved.

The handle operates through six detented control positions; release, minimum reduction, full service, suppression, handle off and emergency. The service zone is between minimum service and handle off positions. A spring loaded latch provides a positive stop for the handle at each of the six detented positions. The spring loaded latch drops into a cam detent preventing any unintended further brake application or release until the handle is intentionally moved to another position by the engineer.

The force required to move the handle from one detented position to another is important as this is the engineer's safeguard against advancing, or retracting, the automatic handle to an unintended control position and thus affecting the amount of brake applied to the train. Higher than normal handle forces may cause the engineer to believe that a brake application is unavailable resulting in the initiation of an unretrievable brake application from other sources, whereas lower than normal forces may cause the handle to be inadvertently moved to some control position other than the intended position, resulting in undesired braking levels. Therefore, consistent brake valve handle forces are important so that locomotive engineers can expect to apply the same handle force on any locomotive to achieve the desired braking levels.

Current manufacturing methods require that the brake valve latch be assembled into the cam housing with a molybdenum fortified petroleum based grease. The grease is required in order to reduce and control the friction between the latch, latch bushing and cam. Controlling the friction between the mating parts provides for uniform handle forces to move the automatic handle through the various detented control positions. Any lubricant substitution, i.e. the use of a lubricant other than that specified, too little lubricant or the absence of lubricant altogether adversely affects the forces required to move the handle and thus apply the train brakes. Inconsistent handle feel has become a concern to railway engineers and ultimately to railroad management.

Thus, there is a growing need for insuring that the handle forces or handle feel on a railway brake valve be consistent. This consistency is not only important through the detented positions on one brake valve but it is equally important that the handle forces be consistent on the brake valve of any locomotive.

SUMMARY OF THE INVENTION

The present invention provides an improved lubrication system for use in a railway locomotive brake valve. Such railway locomotive brake valve includes a suppression cam having a plurality of detented control positions. It further includes a handle connected to the suppression cam for moving the suppression cam to such plurality of detented control positions. There is a spring loaded latch mechanism for engaging the suppression cam and providing a positive stop for such plurality of detented positions. The latch mechanism is a cylindrically shaped member with an elongated convex shaped protrusion at one end for engaging the suppression cam. Such brake valve further includes a bushing surrounding such latch mechanism. Such improved lubrication system comprises a coating of a preselected low friction material applied to and dried on at least one of the latch mechanism, the bushing and the suppression cam.

OBJECTS OF THE INVENTION

It is, therefore, one of the primary objectives of the present invention to provide a brake valve latching mechanism with consistent handle forces.

It is another object of the present invention to provide a brake valve latching mechanism with a latch which has a low friction coating.

It is still another object of the present invention to provide a brake valve latching mechanism with a low friction coating that is colored so as to distinguish the coated latch from such uncoated latch.

Yet, another object of the present invention to provide a brake valve latching mechanism with lubrication only where it is needed.

A further object of the present invention to provide a brake valve latching mechanism with more uniform lubricity.

An additional object of the present invention to provide a brake valve latching mechanism with a low friction coating with an appropriate color wherein the color will indicate high wear areas.

In addition to the several objects and advantages of the invention which have been described above, various other objects and advantages of the present invention will become more readily apparent to those persons who are skilled in the relevant art from the more detailed description of the invention, particularly, when such description is taken in conjunction with the attached drawing Figures and with the appended claims.

Figure 1:
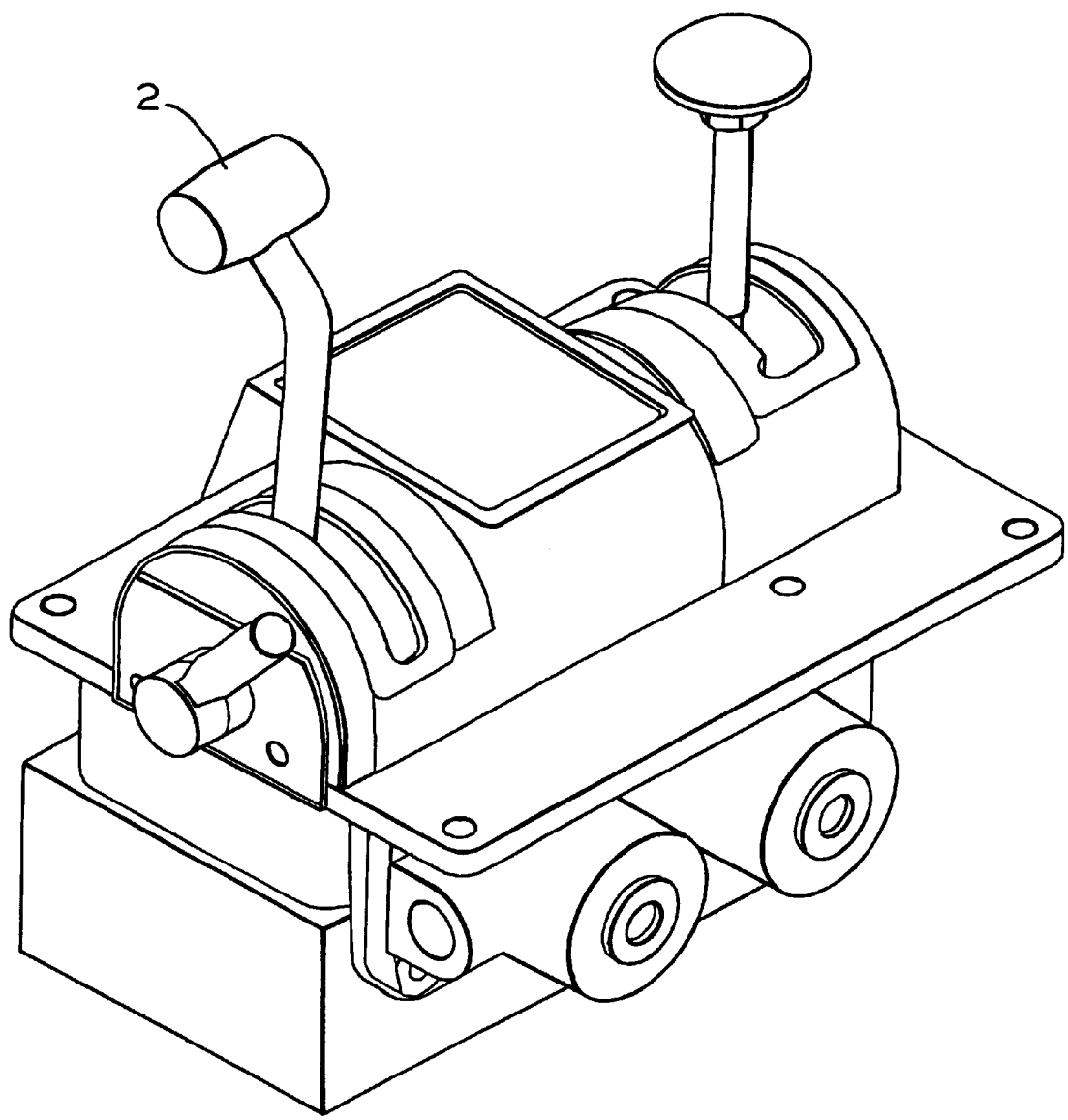
FIG. 1 is a prior art drawing of a 30 Type CDW Brake Valve.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 2:
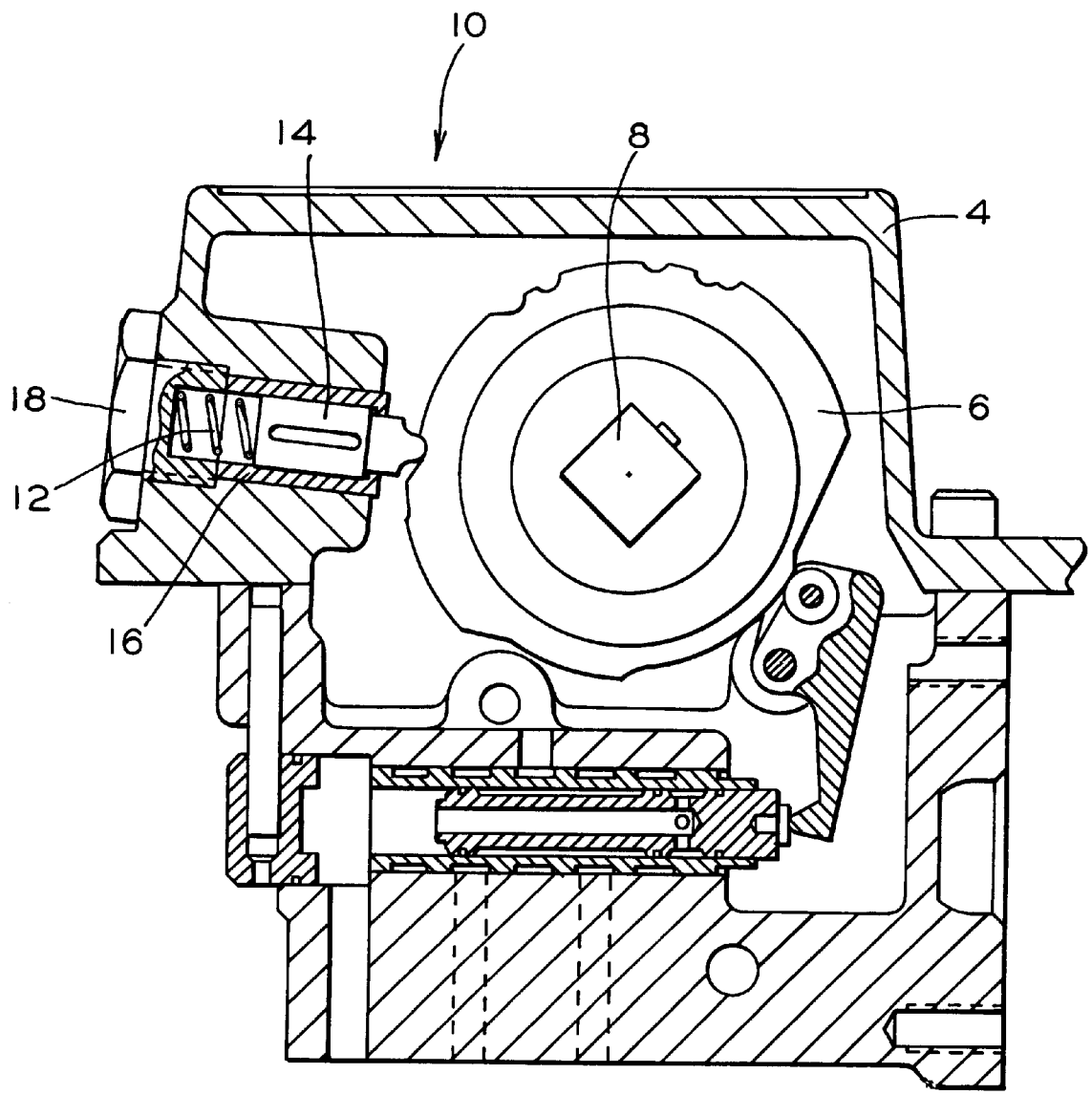
FIG. 2 is a. cross-sectional view of a brake valve latching mechanism of the present invention showing the relationship of the latch and the suppression cam.

Reference is now made to FIG. 2. Illustrated therein is a brake valve latching mechanism, generally designated 10, of the present invention. Such brake valve latching mechanism 10 is contained in cam housing 4. Included in cam housing 4 is a suppression cam 6. Such suppression cam 6 is controlled by an automatic brake valve handle, not shown in FIG. 2, but is designated 2 on FIG. 1. Such automatic brake valve handle 2 operates through 6 detented positions which are found on the outer perimeter of suppression cam 6. These six detented control positions include release, minimum reduction, full service, suppression, handle off and emergency.

The service braking zone is between minimum reduction (or minimum service) and Full Service positions. To apply braking to the train the engineer just pushes the automatic brake valve handle 2 forward until the desired brake application has been achieved. Normal braking begins once the minimum reduction position is reached and continues through to full service.

Such automatic brake valve handle 2 is connected to the cam shaft 8 which in turn controls the movement of the suppression cam 6. A spring 12 loaded latch 14 provides a positive stop for the handle 2 at each of the six detent positions. The spring 12 forces the latch 14 into a suppression cam 6 detent preventing any further unintended brake application or release until the handle is intentionally moved to another position by the engineer. Latch 14 is surrounded and guided by bushing 16. Spring 12 is held in place by latch nut 18. Latch nut 18 has an indentation into which spring 12 is retained, while the other end of spring 12 pushes against latch 14. Latch 14 is cylindrically shaped and has a projection on the end away from spring 12. The projection is convex shaped and is designed to fall into the detents on suppression cam 6.

Current brake valves employ a grease which is applied to latch 14 when the latch 14 is assembled into the cam housing 2. Is presently required that a molybdenum fortified petroleum based grease be used on latch 14 to provide the lubrication deemed necessary. However, any substitution in the type of grease employed, the use of too little lubricant or too much lubricant can adversely affect the forces required to move the handle from one position to another and thus adversely affect the application of the brakes. On the far extreme is the lack of any lubricant at all which can very seriously affect the force required to move the handle.

The present invention provides that at least one of such latch 14, such bushing 16 and such suppression cam 6 be coated with a low friction coating. In the presently preferred embodiment of the invention such latch 14 is coated with a low friction coating. The latch 14 is sprayed with a liquid containing a low friction material and then latch 14 is dried in an oven. It is preferred that such low friction material be selected from polytetrafluoroethylene (PTFE) or modified PTFE, such as a molybdenum disulfide fortified PTFE. In the presently preferred embodiment of the invention such low friction material is polytetrafluoroethylene (PTFE). An example of such PTFE is Xylan, a commercially available material produced by Whitford Corporation.

The latch 14 with the enhanced lubricity coating acts to control the friction level between the mating parts to a low level. This in turn provides that a more uniform force is required to move the handle. Brake valve mechanisms using a latch 14 with such PTFE coatings have been tested dry in brake valves, that is, without any additional lubricant. Brake valve mechanisms using a latch 14 with such PTFE coatings have also been tested with the addition of grease and with the addition of other lubricants. Various greases have been employed in conjunction with the enhanced lubricity coating on latch 14. In the presently preferred embodiment of the invention such grease is selected from one of a molybdenum fortified petroleum based grease and a polytetrafluoroethylene fortified synthetic grease. It was found that the force required to move the handle was consistent with or without additional lubricant. Thus, when latch 14 with a PTFE coating is used, the force required to move the handle is consistent whether the coating is used alone or with other lubricants throughout the handle operating positions and from one valve to another.

It is extremely important for the force required to move the handle from one detent position to another be very consistent, since much of the handle movement is done by feel. This is the engineer's safeguard against moving to an unintended control position and thus affecting the amount of brake that is applied to the train. If higher than normal handle forces are required this may cause the engineer to believe that a brake application is unavailable thus resulting in initiation of an unretrievable brake application from other sources. On the other hand, if lower than normal handle forces are needed then it may cause the handle to be inadvertently moved to an unintended control position resulting in undesired braking levels. Thus the coating on the latch 14 provides that a consistent force is required to move the handle from one position to another.

In another embodiment of the invention a coloring agent was added to the low friction material (PTFE). The addition of a color provided several benefits. First, the color indicated the presence of the coating so that the latch 14 with a coating could be easily distinguished from such latch 14 without the coating. It was found that if a light color, such as red, yellow, orange blue or green, were used that the color tended to discolor at wear areas. In most of the tests a red color was added to the PTFE. The color, additionally, provided an indication of wear on the latch. The fact that the colored coating on latch 14 will discolor on high wear areas allows railroad maintenance personnel to tell if the latch is new or used. Since current Operation and Maintenance information for the brake valve requires that the latch be replaced at each overhaul, the addition of a light colored coating which will discolor provides a positive method of identifying the new verses used status of the latch.

Tests to date have shown that brake valve latches with such polytetrafluoroethylene coating provide acceptable handle forces in all applications studied. This has included lubricated, non-lubricated and with increased spring loads behind the latch. The increased spring loads were used to try to aggravate the conditions so as to provide extreme conditions for the test.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiments shown and described, but should be accorded the full scope and protection of the appended claims

We claim:

1. An improved lubrication system for use in a railway locomotive brake valve including a suppression cam having a plurality of detented control positions, a handle connected to said suppression cam for moving said suppression cam to said plurality of detented control positions, a spring loaded latch mechanism engaging said suppression cam and providing a positive stop for said plurality of detented positions, said latch mechanism being a cylindrically shaped member with an elongated convex shaped protrusion at one end for engaging said suppression cam, and a bushing surrounding said latch mechanism, said lubrication system comprising: a coating of a preselected low friction material applied to and dried on at least one of said latch mechanism, said bushing and said suppression cam.

2. An improved lubrication system for use in a railway locomotive brake valve, according to claim 1, wherein said latch mechanism is coated with said low friction material.

3. An improved lubrication system for use in a railway locomotive brake valve, according to claim 2, wherein said low friction material is selected from one of polytetrafluoroethylene and a molybdenum fortified polytetrafluoroethylene.

4. An improved lubrication system for use in a railway locomotive brake valve, according to claim 3, wherein said low friction material is polytetrafluoroethylene.

5. An improved lubrication system for use in a railway locomotive brake valve, according to claim 4, wherein said polytetrafluoroethylene further includes a preselected coloring agent.

6. An improved lubrication system for use in a railway locomotive brake valve, according to claim 5, wherein said preselected coloring agent is selected from red, green, blue yellow and orange.

7. An improved lubrication system for use in a railway locomotive brake valve, according to claim 2, wherein said latch mechanism coated with said low friction material further includes a substantially semi-solid lubricant applied over said low friction material.

8. An improved lubrication system for use in a railway locomotive brake valve, according to claim 7, wherein said substantially semi-solid lubricant is a grease.

9. An improved lubrication system for use in a railway locomotive brake valve, according to claim 8, wherein said grease is selected from one of a molybdenum fortified petroleum based grease and a polytetrafluoroethylene fortified synthetic grease.

10. An improved lubrication system for use in a railway locomotive brake valve, according to claim 1, wherein said low friction material further includes a preselected coloring agent.

11. An improved lubrication system for use in a railway locomotive brake valve, according to claim 1, wherein a substantially semi-solid lubricant is applied to an outer periphery of said suppression cam.

12. An improved lubrication system for use in a railway locomotive brake valve, according to claim 11, wherein said substantially semi-solid lubricant is a grease.

13. An improved lubrication system for use in a railway locomotive brake valve, according to claim 1, wherein said bushing is coated with said low friction material.

14. An improved lubrication system for use in a railway locomotive brake valve, according to claim 13, wherein said latch mechanism further includes a substantially semi-solid lubricant.

15. An improved lubrication system for use in a railway locomotive brake valve, according to claim 14, wherein said substantially semi-solid lubricant is a grease.

16. An improved lubrication system for use in a railway locomotive brake valve, according to claim 15, wherein said grease is selected from one of a molybdenum fortified petroleum based grease and a polytetrafluoroethylene fortified synthetic grease.

17. An improved lubrication system for use in a railway locomotive brake valve, according to claim 13, wherein said low friction material is selected from one of polytetrafluoroethylene and a molybdenum fortified polytetrafluoroethylene.

18. An improved lubrication system for use in a railway locomotive brake valve, according to claim 17, wherein said low friction material further includes a preselected coloring agent.

19. An improved lubrication system for use in a railway locomotive brake valve, according to claim 1, wherein said suppression cam is coated with said low friction material.

20. An improved lubrication system for use in a railway locomotive brake valve, according to claim 19, wherein said low friction material is selected from one of polytetrafluoroethylene and a molybdenum fortified polytetrafluoroethylene.

* * * * *